United States Patent
Lang

(12) 
(10) Patent No.: US 6,520,111 B2
(45) Date of Patent: Feb. 18, 2003

(54) ROTARY DRUM SEEDER

(75) Inventor: Kirk Alan Lang, Trinity, FL (US)

(73) Assignee: Fedco Systems Co., Odessa, FL (US)

( * ) Notice: Subject to any disclaimer, the term of this patent is extended or adjusted under 35 U.S.C. 154(b) by 0 days.

(21) Appl. No.: 09/826,651

(22) Filed: Apr. 5, 2001

(65) Prior Publication Data

US 2002/0046696 A1 Apr. 25, 2002

Related U.S. Application Data

(60) Provisional application No. 60/194,756, filed on Apr. 5, 2000.

(51) Int. Cl.[7] .............................................. B05C 19/04
(52) U.S. Cl. ........................... 118/13; 118/24; 118/301; 118/308; 118/676
(58) Field of Search ............................. 118/13, 24, 301, 118/308, 676; 427/180; 426/289

(56) References Cited

U.S. PATENT DOCUMENTS

| | | | |
|---|---|---|---|
| 3,245,341 A | * | 4/1966 | Childress et al. ............ 101/115 |
| 4,029,235 A | | 6/1977 | Grataloup |
| 4,157,652 A | | 6/1979 | Mathes et al. |
| 4,306,509 A | * | 12/1981 | Hassan et al. ............... 111/179 |
| 4,448,331 A | | 5/1984 | Millette et al. |
| 4,611,555 A | | 9/1986 | Burford |
| 4,666,069 A | | 5/1987 | Morine et al. |
| 4,715,315 A | | 12/1987 | Burford |
| 5,419,246 A | | 5/1995 | Bibby |

OTHER PUBLICATIONS

Brochure/Catalog; Granule Printer, Printing with granules in a precise design layout.
Trade Journal; Products and Services (undated).

* cited by examiner

*Primary Examiner*—Laura Edwards
(74) *Attorney, Agent, or Firm*—Killworth, Gottman, Hagan & Schaeff LLP

(57) ABSTRACT

A rotary drum seeder for depositing seeds onto food products. The seeder includes a primary support structure, rotary drum assembly, seed hopper, feed gate disposed between the seed hopper and a hopper discharge, and controller. The surface of a rotatable drum of the drum assembly includes repeating patterns made up of apertures. Seeds are selectively adhered to and dislodged from the apertures by high and low pressure fluids provided to the apertures. The low and high pressure fluids come from a vacuum source and a high pressure source, respectively. The vacuum source causes seeds to adhere to the apertures, while the high pressure source generates a localized positive fluid pressure in a seed dislodging device disposed within the rotary drum, thereby forcing the seeds from the apertures when they pass over the seed dislodging device. A boundary layer air knife is used to remove excess seeds from the surface of the rotary drum. Signals from the controller direct the drum to rotate a specified amount in response to the arrival of a conveyor-carried tray of product onto which seeds are to be deposited.

28 Claims, 7 Drawing Sheets

ROTARY DRUM SEEDER

Figure 1A:
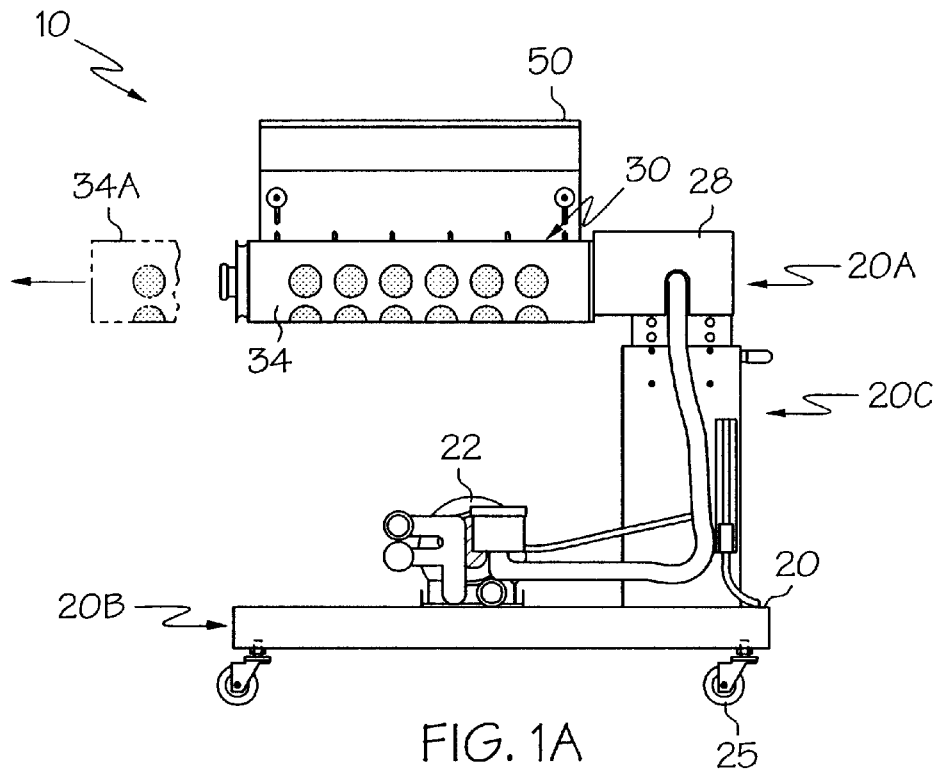

This application claims the benefit of U.S. Provisional Application No. 60/194,756 filed Apr. 5, 2000.

BACKGROUND OF THE INVENTION

The present invention relates to a system for dispensing particulate matter onto a substrate, and more particularly to a rotating drum seeder for placing sesame seeds onto a plurality of buns traveling at a high rate of speed along a conveyor.

The use of seed-depositing devices is well known in the art. In various food processing applications, these devices are used to introduce seeds and related edible flavorings to bakery products, such as rolls, loaves of bread and sandwich buns. In the production of seeded sandwich buns, a continuous conveyor, often carrying trays containing a number of buns, is passed under a seed-dispensing device including a spreader connected to a seed hopper. Typically, the spreader includes an inlet section which receives a continuous flow of seed from the seed hopper, and a toothed auger to agitate and dispense the seeds onto buns passing beneath on a conveyor. In order to manufacture large quantities of finished product in a timely fashion, such as for a restaurant or retail grocery store, the process must have a high throughput, thereby necessitating high-speed conveying and deposition methods. An unfortunate concomitant to this requirement is that the quantity of seeds placed on the surface of each bun can be highly non-uniform, resulting in an aesthetically unappealing, and possibly unappetizing final product. Furthermore, seed spillage and related inability to control seed-dispensing patterns results in substantial amounts of feedstock waste. The requirement for speed, as well as reliance on gravity as the final stage in the deposition process, has worked a detriment to the prior art systems.

Accordingly, there is a need for a device that overcomes the above problems by uniformly and repeatably dispensing seeds in closely regulated amounts with a minimum amount of wasted feedstock. Furthermore, there is a need for a device that eliminates or reduces reliance on gravity-based deposition techniques, in order to satisfy the ever-increasing need for simpler, cheaper, more reliable seeding devices.

BRIEF SUMMARY OF THE INVENTION

This need is met by the present invention wherein a rotary drum seeder is disclosed that overcomes many of the problems associated with the prior art. In accordance with one embodiment of the present invention, a rotary drum assembly for depositing particulate matter on a substrate is disclosed. The assembly includes a rotatable drum with a substantially hollow internal portion and an axis of rotation along the drum length. In the present context, the term "substantially" implies that, while the article is generally as described, the description requires something less than exact correspondence. For example, the inclusion of other components (such as support structure, fluid conduit and the like) in the internal cavity of the drum does not defeat its hollow nature merely because something less than 100% of the interior is available for the placement of a fluid or vacuum. A matrix of repeating patterns are formed on an outer surface of the drum, and each of the patterns are defined by a plurality of apertures, each of which are connected to the internal surface of the drum by a tubular bore, thereby ensuring fluid communication therethrough. The substantially hollow internal portion of the rotatable drum is capable of supporting at least a partial vacuum, which can be accomplished by placing the substantially hollow internal portion in fluid communication with a negative fluid pressure source, such as a vacuum pump. A particulate dislodging device operating locally within the drum's internal portion exposes the apertures passing by that locality to a fluid overpressure. This overpressure is sufficient to overcome adhering forces present in the substantially hollow internal portion. Thus, upon applying a vacuum to the substantially hollow internal portion of the rotatable drum, particulate matter is drawn into operative contact with the apertures on the drum surface, where they stay until such time as the drum rotates to put the particulate-holding apertures into operative communication with the particulate dislodging device, whereupon the particulate matter is forcibly dislodged from the apertures by the particulate dislodging device.

Optionally, a main drive is coupled to the rotatable drum to effect drum rotation. The main drive may be either constant speed or variable speed. A clutch may be included to permit the drum to rotationally decouple from the main drive periodically. The clutch, for example, may be of the single rotation variety, such that after each complete particulate-dispensing cycle, the drum comes to at least an intermittent stop. Also, quick-release couplings and axial mounting can be used to ensure rapid drum assembly interchangeability to accommodate different aperture patterns on the drum surface. The apertures can further be dimpled to facilitate better particulate matter holding. The particulate dislodging device can be a positive fluid pressure device that is in fluid communication with a high pressure fluid source, such as that coming from a pressurizing pump. The drum also may include a stationary mandrel to establish differential pressure fluid communication between a vacuum source and the internal hollow portion of the drum, as well as between a high pressure source and the positive fluid pressure particulate dislodging device. In this capacity, the differential pressure fluid provided through the stationary mandrel includes both positive and negative pressure fluid. In the present context, a differential fluid pressure source, such as a pump, can be a source for either positive fluid pressure, negative/vacuum fluid pressure, or both simultaneously. The mandrel may further include a plurality of coaxial annular chambers for fluid communication, thus permitting an efficient fluid pressure carrying structure to operate substantially within the internal portion of the drum.

In accordance with another embodiment of the present invention, a rotary drum seeder for placing a plurality of seeds on the surface of foodstuffs is disclosed. The seeder comprises a primary support structure, a controller, a hopper for holding a quantity of seeds, a gate disposed between the seed hopper and a hopper discharge, and a rotary drum assembly in seed communication with the hopper discharge. By "seed communication", the hopper discharge and the rotary drum assembly are placed in relation to one another such that the addition of a quantity of seeds establishes a contiguous connection therebetween. The rotary drum assembly is identical to that of the previous embodiment, where references to the particulate matter in this embodiment specifically pertain to edible seeds, such as sesame seeds. Thus, upon operation of the rotary drum seeder, the seeds are drawn into operative contact with the apertures until such time as the rotary drum rotates the seeds to be in operative contact with a seed dislodging device, whereupon the overpressure causes the seeds to be forced from the apertures and deposited onto foodstuffs passing beneath.

Optionally, the seed dislodging device disposed within the rotary drum is a pressure shoe. The pressure shoe, which provides a continuous supply of pressurized fluid, dislodges the seeds when the dimpled seed cavities disposed on the outer surface of the drum pass over the shoe, thereby permitting an intermittent burst of pressurized fluid to pass through a tubular bore that connects the cavity to the substantially hollow internal portion of the rotary drum assembly's rotatable drum, thus overcoming seed adhesion caused by the internal vacuum action. The rotary drum seeder optionally includes an air knife disposed between the hopper discharge and the rotary drum. The air knife uses a sheet-like air scraper to shake loose extra seeds adhering to the drum surface caused by residual vacuum around the apertures. This ensures that a consistent, repeatable quantity of seeds is deposited on the target food substrates. To ensure that an adequate supply of seeds is reaching the hopper discharge through the gate, an optional hopper agitator or vibrator may be added. This is valuable in situations where the seeds, which by virtue of their shape or hygroscopic nature, could stick together and would otherwise inhibit their normal free-flow from the seed hopper to the hopper discharge. The primary support structure of the rotary drum seeder may also include mounted wheels to enhance system portability. Similarly, a rotary drum height adjuster can be included to adjust to varying conveyor heights. Such adjuster is operatively responsive to user input, and can include hydraulic adjustment features to facilitate ease of use. Furthermore, as with the previous embodiment, the drum is readily interchangeable by axial removal and quick-release coupling features. This feature is advantageous in situations where different patterns to be deposited on the food substrate are desired. The rotary drum seeder may also include a stationary mandrel disposed substantially in the drum's internal portion, in a manner similar to that of the previous embodiment. In the present embodiment, the mandrel includes a vacuum port and a pressure port to fluid connect the substantially hollow internal portion of the drum and the seed dislodging device to the vacuum source and the pressurized fluid source, respectively.

The rotary drum seeder of the present embodiment can also be synchronized with a foodstuff transporting apparatus, such as a moving conveyor, so that, upon detection of the arrival of a batch of food substrates, the rotary drum seeder can be made to perform one or more seed-dispensing cycles. This could be accomplished with a conventional motion or proximity sensor such that upon arrival of a container or the like holding the foodstuff to be coated, a signal can be sent to the controller to direct the rotary drum to advance a predetermined amount (such as one rotation) in order to deposit seeds onto the foodstuffs with minimal waste.

In accordance with yet another embodiment of the present invention, a method of depositing seeds on the surface of a plurality of food substrates is disclosed. The method includes the steps of placing seeds in a seed hopper, where the seed hopper is in seed communication with a rotary drum; adjusting a gate to permit seeds to flow from the seed hopper and into operative contact with a surface of the drum, which contains repeated patterns disposed thereon, each pattern comprising a plurality of individual apertures; establishing vacuum communication between the rotary drum and a vacuum source; establishing pressure communication between a seed dislodging device disposed within the rotary drum and a high pressure source; establishing operative connection between a main drive and the rotary drum; activating a main drive to prepare the drum for rotation; activating vacuum and pressure sources necessary for preferentially adhering and dislodging the seeds to and from the drum surface; detecting with a signal-sending sensor the presence of a transporting pan containing the plurality of food substrates; and rotating the drum in response to a signal received from the signal-sending sensor, where the rotation of the drum is timed to match the speed of the transporting pan. The step of creating a vacuum within the drum and establishing vacuum communication between the vacuum and the seeds causes the seeds to adhere to the plurality of apertures and adjacent areas. The drum is rotated to place more of the seeds into operative contact with more of the repeating patterns, and excess seeds are removed from the surface of the drum. The transporting pan is brought into alignment with a seed dislodging device disposed within the rotary drum such that when the seeds adhered to the apertures in the drum surface are moved within operative proximity to the seed dislodging device, the seeds are forced out of the apertures by the seed dislodging device, and deposited onto the food substrate disposed within the transporting pan.

Optionally, the step of removing excess seeds from the external surface of the drum can be accomplished with a boundary layer air knife or similar approach, which can be used to return the excess seeds to a hopper discharge disposed between the seed hopper and the rotary drum such that they remain in seed communication with the rotary drum, rather than spill or otherwise be wasted. Another option involves the use of a conveyor to transport the pan containing the food substrates. Furthermore, the apertures in the surface of the rotary drum may consist of dimpled cavities to minimize the risk of seeds becoming caught or wedged in the apertures, thereby ensuring better, more uniform seed adhesion. In addition, the seed-dispensing mechanism is a pressure shoe that effects separation of the seeds from the surface of the rotary drum by overcoming the vacuum inside the drum through the pressurized gas forced through the apertures. An additional step can include stopping the rotary drum after each complete revolution such that it can await the passage of another pan, achieving a stepped, rather than continuous rotation of the drum. This stepped rotation can be achieved through the use of a single-rotation clutch coupled to the main drive. Another additional step could include coating the food substrate with an adhesion-enhancing substance (such as a water mist) prior to depositing the seeds onto the substrate, to enhance the adhesion of the deposited seeds to the target substrate.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which:

FIGS. 1A and 1B are end- and side-elevation views showing a rotary drum seeder according to the present invention;

FIG. 2 is a view of selected vacuum chamber and support features of a rotary drum according to the present invention;

FIGS. 3 and 4 illustrate a rotary drum seeder according to the present invention during two stages of operation;

FIG. 5 is an illustration of a bun seeded with a rotary drum seeder according to the present invention;

FIG. 6 is an illustration of a bun pan utilized with a rotary drum seeder according to the present invention; and FIGS. 7A through 7D present details of the surface of the vacuum drum of the rotary drum seeder according to the present invention.

DETAILED DESCRIPTION

Figure 1B:
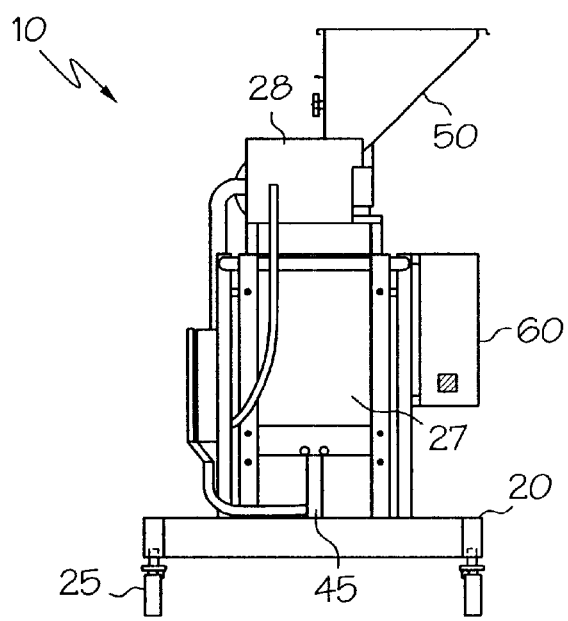
Figure 2:
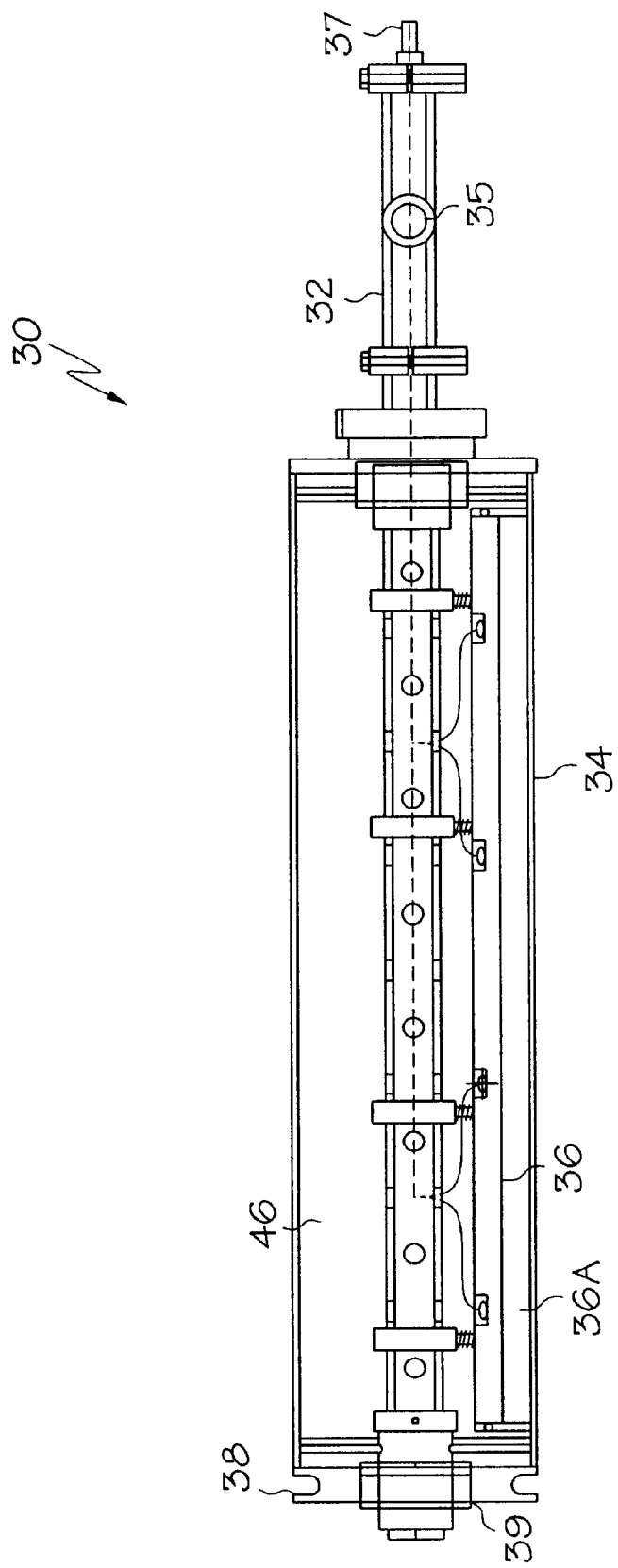

Referring initially to FIGS. 1A and 1B, a rotary drum seeder system 10 according to the present invention comprises a primary support structure 20, in the form of a cantilevered chassis or frame to support the system components. Typically, primary support structure 20 is made of a food-grade structural material, such as stainless steel. The primary support structure 20 comprises three main portions: an upper arm 20A, a lower arm 20B and an upstanding interconnect 20C. To improve the portability of system 10, lower arm 20B of primary support structure 20 is mounted to level swivel wheels, or casters 25. The system 10 also includes a pump 22, a main drive 27 with clutch 28 to provide rotational power to a rotary drum assembly 30, a hydraulic drum height adjuster 45, a seed hopper 50, and a control panel 60. Partial cutaway 34A of a rotatable drum 34 (discussed in more detail below) in rotary drum assembly 30 is used to show the direction of drum 34 removal. Quick-release couplings (not shown) can be used in conjunction with the axial removal orientation to facilitate easy replacement of the drum 34, for example, where a different seed pattern is desired. Pump 22 is a regenerative blower, in that it combines a motor with a vacuum, thus acting as a negative fluid pressure source. While pump 22 could also provide pressurized fluid, it is preferable in this embodiment that the such pressurized fluid come from an external source. Control panel 60, which includes an internally mounted controller 61, is preferably a conventional microprocessor-based feedback device, into which user-defined modes of operation may be placed. In the present context, the vacuum and pressurized fluids are referred to collectively as differential pressure fluids, with the vacuum fluid alternately referred to as "negative fluid pressure" fluid, and the pressurized fluid alternately referred to as "positive fluid pressure" or "high pressure" fluid. The selective use of the differential pressure fluids help determine whether a seed is adhered to or dislodged from the surface of rotary drum assembly 30. Moreover, the differential pressure fluid of the present invention can be either a liquid or a gas, such as air.

Referring now to FIGS. 2 and 7A–D, the rotary drum assembly 30 includes, in addition to aforementioned rotatable drum 34, a stationary mandrel 32 for establishing differential pressure fluid communication between drum 34 and vacuum and pressurized fluid sources (not shown), a vacuum port 35, a seed dislodging device in the form of a pressure shoe 36, a high pressure fluid port 37, and an end plate 38 incorporating a bearing 39. Both positive fluid pressure fluid and negative pressure fluid flow through mandrel 32 via annular chambers disposed therein. In a preferred embodiment, those chambers are coaxial, thus presenting a structurally more efficient profile, but they need not be so configured. It is noted that the fluid pressure in the pressure shoe 36 need only be positive with respect to the pressure level in substantially hollow internal portion 46 of the drum 34. Thus, if a vacuum is pulled in substantially hollow internal portion 46, ambient atmospheric air could constitute sufficient overpressure to force seeds 12 or related particulate matter from a series of apertures in the shape of dimpled cavities 40 (shown in FIG. 7D). The shape of dimpled cavities 40 is hemispherical to avoid having oblong or odd-shaped seeds block the aperture by becoming wedged. One way to achieve the more passive approach of using ambient air to provide the overpressure is to have a fluid line (not shown) connect pressure shoe 36 to the ambient atmosphere. Such a fluid line may be routed through the stationary mandrel 32 in much the same way high pressure fluid port 37 is, although it need not be. While drum 34 is shown in the figures as an elongate cylinder, it will be appreciated by those skilled in the art that the drum need not be elongate, or even cylindrical. For example, the drum could be of a faceted configuration such that it presents a hexagonal or related geometric cross-section.

Figure 7A:
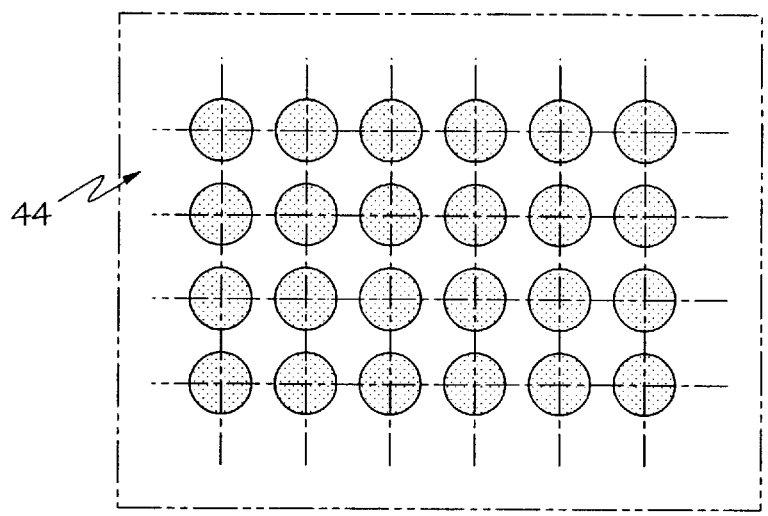
Figure 7B:
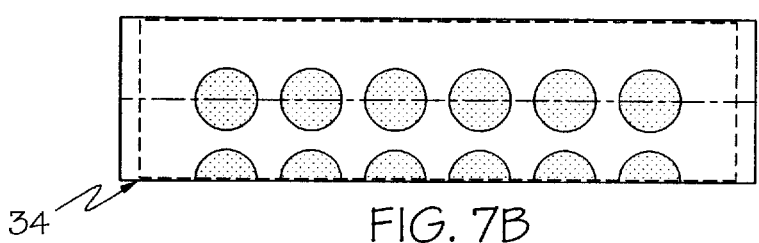
Figure 7C:
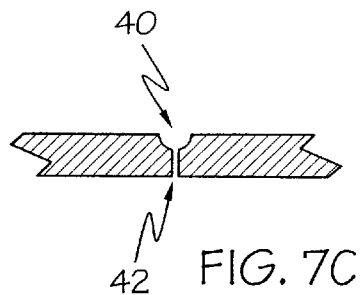
Figure 7D:
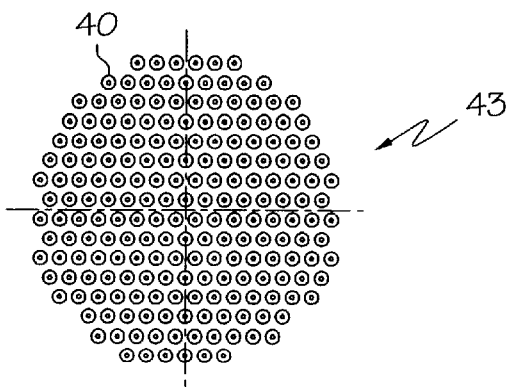

Dimpled cavities 40 (shown in FIGS. 7C and 7D) are formed on the outer surface of the drum 34 (shown in FIG. 7B) in seed-dispensing patterns 43 (shown in FIG. 7D), a repeating series of which in turn makes up a seed-dispensing matrix 44, as illustrated in FIG. 7A. The dimpled cavities 40 communicate with a vacuum space in the substantially hollow internal portion 46 of the drum 34 via tubular bores 42. The configuration of the drum 34 is canister-like, such that the substantially hollow internal portion 46 of drum 34 houses the pressure shoe 36 and related differential pressure fluids. During operation, substantially hollow internal portion 46 is designed to operate under at least a partial vacuum, such that it acts as a negative fluid pressure adhering device, causing the seeds 12 to adhere to dimpled cavities 40. Conversely, pressure shoe 36 acts, during operation, as a positive fluid pressure seed dislodging device, expelling the seeds 12 held in dimpled cavities 40 upon passage of the cavities 40 past the discharge port 36A of pressure shoe 36. The high and low pressure fluids for each of these devices are supplied through stationary mandrel 32. The interchangeable drum 34 can be made of any conventional food-grade material, such as anodized aluminum or plastic.

Figure 3:
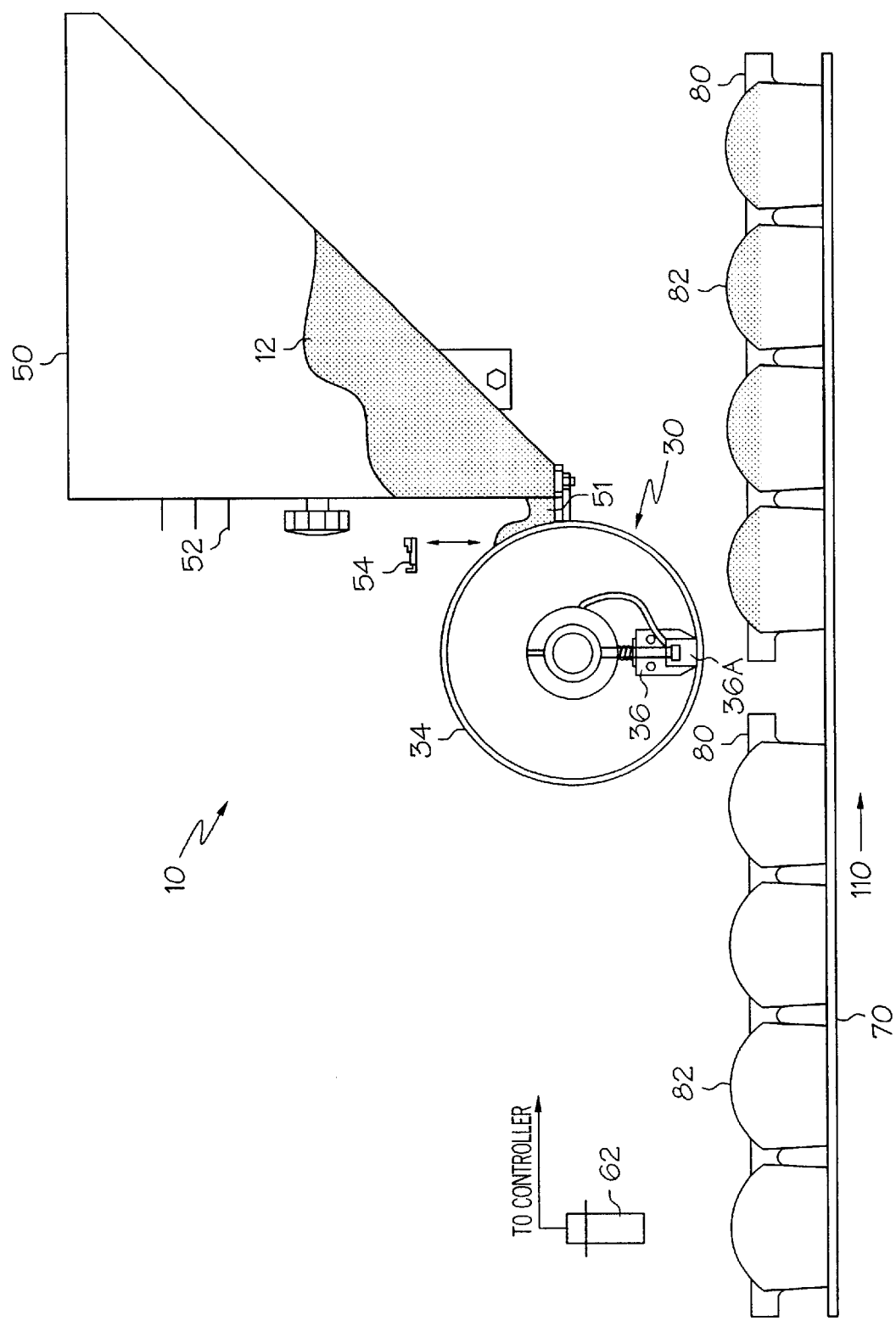
Figure 4:
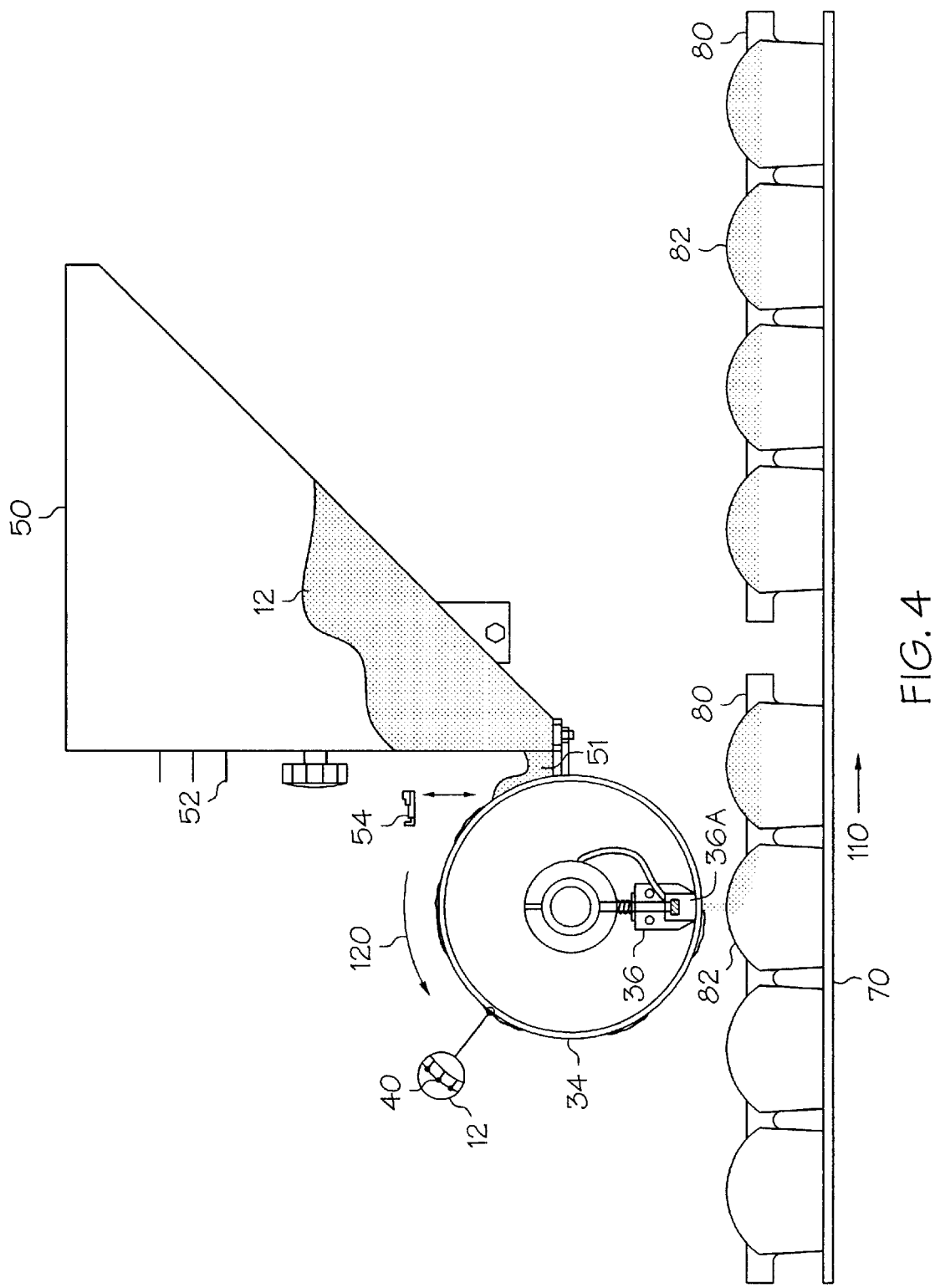

Referring now to FIGS. 3 and 4, the seed dispensing operation will now be discussed. Seeds 12 (such as sesame seeds) are placed in seed hopper 50, the capacity of which can vary from application to application, but is notionally shown as capable of holding about 30 to 40 pounds of feedstock. Gate 52 is adjusted to generate free flow of seeds 12 from seed hopper 50 to hopper discharge 51, which is adjacent rotatable drum 34 such that a contiguous path permits hopper discharge 51 and interchangeable drum 34 to be in seed communication with one another. This promotes seed 12 transfer to the dimpled cavities 40 on the surface of drum 34. The system is positioned such that a conventional conveyor 70 passes vertically between the rotary drum assembly 30, located on previously shown upper arm 20A of primary support structure 20, and previously shown pump 22, situated on a lower arm 20B of primary support structure 20. The conveyor 70 is arranged to support and convey a succession of bun pans 80, each of which accommodates a plurality of buns 82 or similar baked goods. The system 10 is initialized by powering-up previously shown pump 22 coupled to previously shown vacuum port 35, connecting a high pressure source to the previously shown high pressure fluid port 37, and the previously shown main drive 27 coupled to the rotary drum assembly 30 via the single rotation clutch 28. High pressure fluid port 37 is in fluid communication with the pressure shoe 36 to provide air of sufficient pressure to overcome the adhesive force applied to the seeds 12 by the vacuum being supplied to substantially hollow internal portion 46 by vacuum port 35. In addition, clutch 28 could operate in a single-rotation mode, thus permitting the drum to make one complete rotation in synchronous response to a signal sent to the controller 61 from a signal-providing sensor 62. In this single-rotation mode, the clutch 28 decouples the drum from the main drive 27 until another signal is received.

As a bun pan 80 moves along the conveyor 70, it trips a conventional signal providing sensor 62 coupled to the control panel 60 and controller 61. In response, clutch 28 is engaged and the drum 34 begins to rotate. The controller 61 matches the rotational speed of the drum 34 to the translational speed of the conveyor 70. A vacuum is created by the pump 22, through the vacuum port 35 and into the drum 34. This vacuum coaxes seeds 12 flowing freely from adjacent hopper discharge 51 into the dimpled cavities 40 formed on the outer surface of the drum 34. Excess seeds are returned to the seed hopper 50 via an air knife 54, thus maximizing the likelihood that the seeds 12 deposited on each bun resembles pattern 43 (FIG. 7D), thereby ensuring a repeatable, consistent-quality finished product, as well as minimizing seed waste. As the seeds approach proper alignment with the buns 82, they pass over the pressure shoe 36, where air of sufficient pressure is ejected through discharge port 36A and is applied to the seeds 12 through bores 42 and dimpled cavities 40 in order to overcome the adhesive force of the vacuum. Consequently, the seeds 12 held in the dimpled cavities 40 are forcibly blown in the direction of buns 82 held in the bun pan 80, rather than through the passive effect of gravity. Preferably, the pressure shoe 36 is located at or near the lowermost portion of drum 34 so that the seeds 12 being dislodged travel as short a path as possible, thus minimizing deposition errors.

Figure 5:
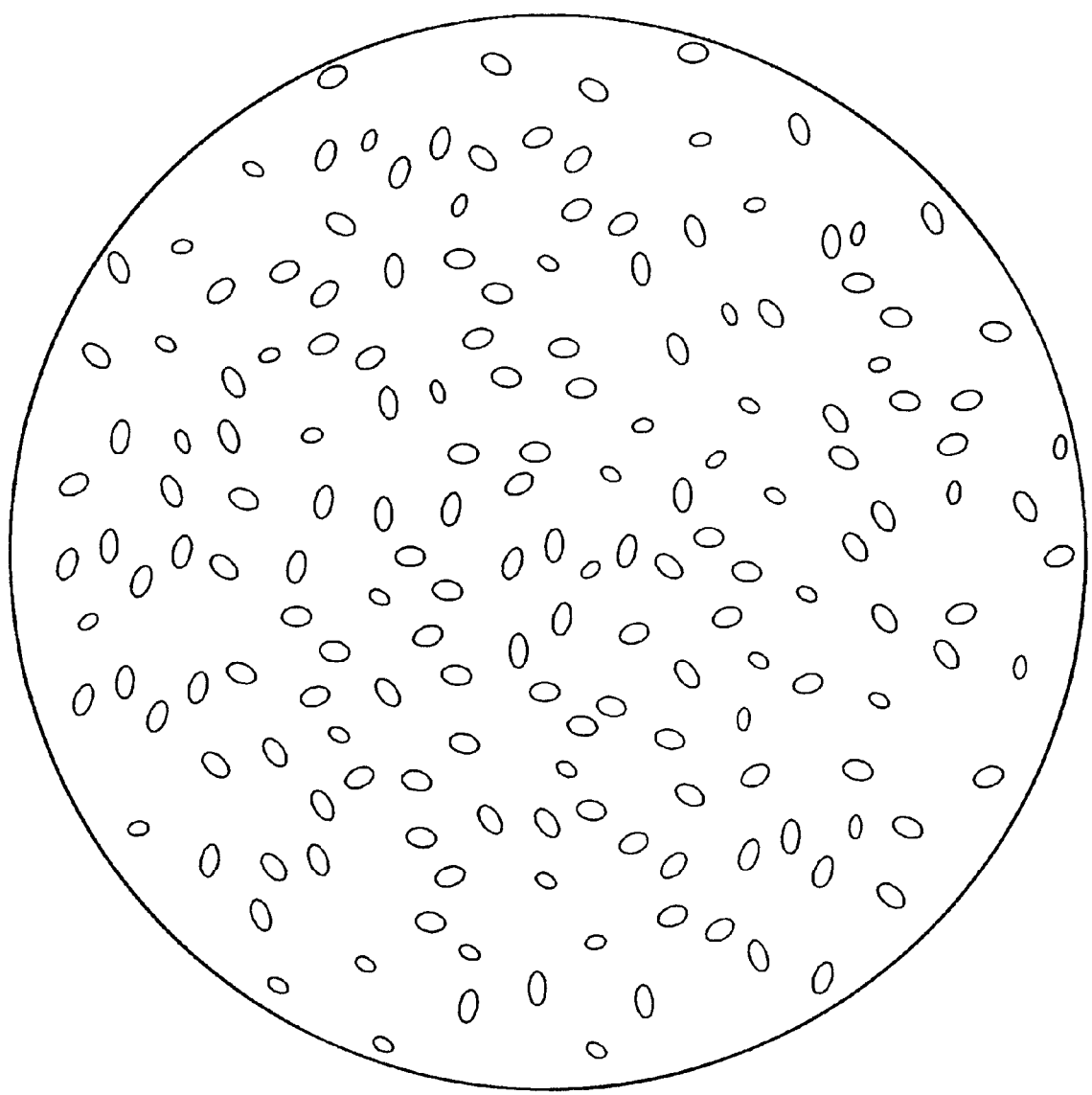
Figure 6:
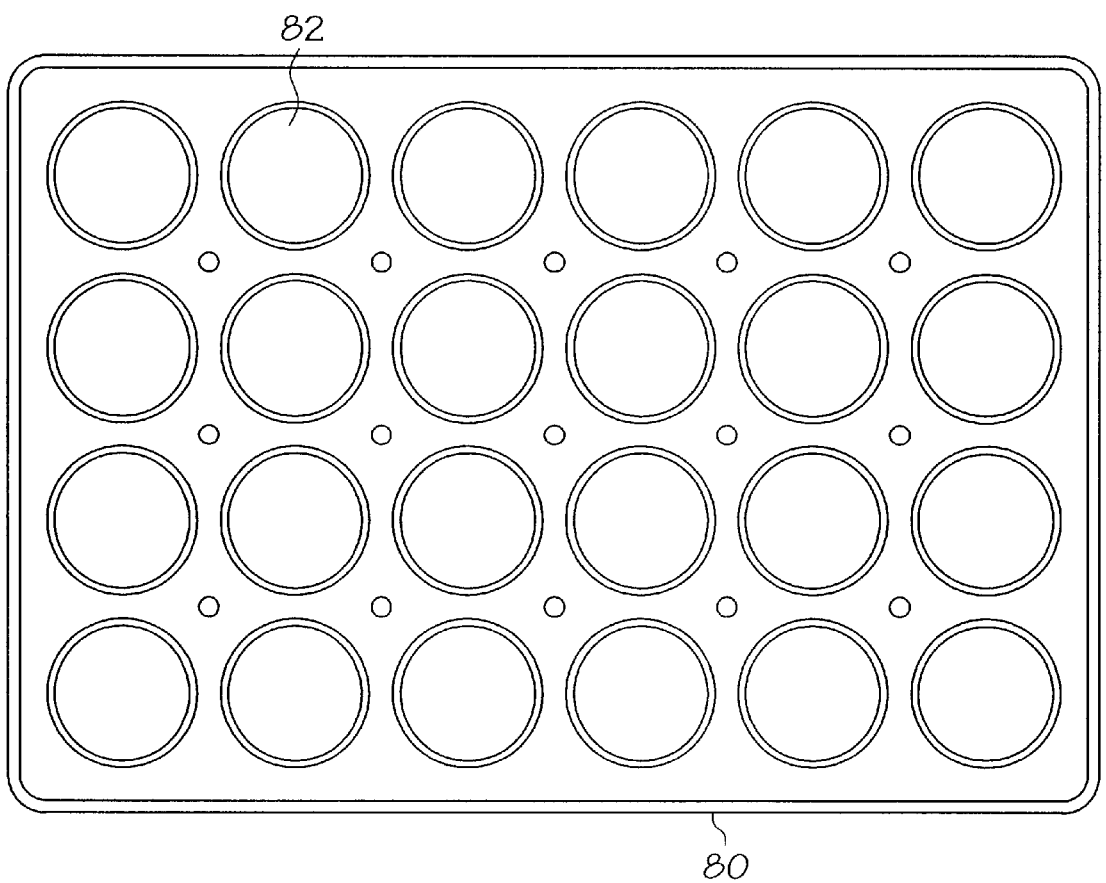

As is illustrated in FIGS. 6 and 7A–7D, each pattern 43 of cavities 40 is arranged to match the position of the buns 82 in the bun pan 80 so that one rotation of the drum results in the deposition of seeds on each bun 82 with minimal waste. Following one complete rotation of the drum 34, the seeder returns to a ready state waiting for the next bun pan 80 to trigger the signal providing sensor 62. In addition, the dimpled cavities 40 are arranged in a predetermined, preferably random, pattern on the surface of the drum 34 to provide an aesthetically pleasing finished product. A selected seed pattern representative of the randomized deposition approach is illustrated in FIG. 5. It is contemplated by the present invention that the interchangeable drum 34 may be provided with any one of a variety of specific cavity patterns, depending upon the requirements of the particular seeding application. It is also contemplated by the present invention that the seed hopper 50 may be provided with an agitator or mechanical vibrator (neither of which are shown) to encourage continuous uniform flow of seeds from the seed hopper 50 into hopper discharge 51. A water mist application station (not shown) can be provided upstream of the seeder deposition point and is operative to moisten the surfaces of the buns 82 held in the bun pan 80. In this manner, adhesion of the seeds 12 to the surface of the buns 82 is enhanced. The particular design of the application station is not critical to the present invention and may comprise a conventional water mist arrangement or an arrangement where a mist is created with the use of a spinning disk and a mist hood.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A rotary drum assembly for depositing seeds on a food substrate, said assembly comprising:
    a rotatable drum with a substantially hollow internal portion and an axis of rotation along its length, said hollow internal portion configured to be in communication with a vacuum source;
    a matrix of repeating patterns formed on an outer surface of said rotatable drum, each of said patterns defined by a plurality of apertures, each of said plurality of apertures connected to at least one bore so as to be in fluid communication with said substantially hollow internal portion; and
    a dislodging device disposed within said substantially hollow internal portion and arranged to force said seeds held by said vacuum source in said plurality of apertures therefrom upon passage of said seeds adjacent said dislodging device.

2. A rotary drum assembly according to claim 1, further comprising a main drive coupled to said rotatable drum to enable rotation thereby.

3. A rotary drum assembly according to claim 2, further comprising a clutch coupled to said rotatable drum and said main drive to permit said rotatable drum to rotationally decouple from said main drive.

4. A rotary drum assembly according to claim 3, wherein said clutch is a single rotation clutch.

5. A rotary drum assembly according to claim 1, wherein said drum includes a quick-release coupling to facilitate ease of drum interchangeability.

6. A rotary drum assembly according to claim 1, wherein said plurality of apertures are dimpled.

7. A rotary drum assembly according to claim 1, wherein said dislodging device comprises a positive fluid pressure device.

8. A rotary drum assembly according to claim 7, further comprising a stationary mandrel disposed substantially within said substantially hollow internal portion of said rotatable drum, said stationary mandrel to establish:
    vacuum communication between said substantially hollow internal portion and said vacuum source; and
    positive fluid pressure communication between said positive fluid pressure device and a positive fluid pressure source.

9. A rotary drum assembly according to claim 8, wherein said mandrel includes a plurality of annular chambers, a first of said chambers arranged to establish said vacuum communication, and a second of said chambers arranged to establish said positive fluid pressure communication such that upon operation of said vacuum source, said particulate matter is drawn into operative contact with said plurality of apertures until such time as said rotary drum rotates said apertures holding said particulate matter into operative contact with said positive fluid pressure device, whereupon said particulate matter is dislodged from said plurality of apertures by said positive fluid pressure device.

10. A rotary drum seeder system for placing a plurality of seeds on the surface of foodstuffs, said seeder comprising:
    a primary support structure;
    a controller connected to said primary support structure;
    a seed hopper connected to said primary support structure, said seed hopper for holding a quantity of seeds;
    a gate disposed between said seed hopper and a hopper discharge, said gate to control the flow of said seeds from said seed hopper to said hopper discharge;
    a rotary drum assembly in seed communication with said hopper discharge, said assembly comprising:
        a rotatable drum with a substantially hollow internal portion and an axis of rotation along its length, said substantially hollow internal portion operatively responsive to and in fluid communication with a vacuum source;
        a matrix of repeating patterns formed on an outer surface of said rotatable drum, each of said patterns defined by a plurality of apertures, each of said plurality of apertures connected to at least one bore so as to be in vacuum communication with said substantially hollow internal portion to promote temporary adhesion of said seeds; and a seed dislodging device operatively responsive to and in fluid communication with a pressurized fluid source, said seed dislodging device disposed within said substantially hollow internal portion to force said seeds from said rotary drum upon passage of said seeds adjacent said seed dislodging device; and a main drive coupled to said rotatable drum, thereby providing rotational capability thereto.

11. A rotary drum seeder according to claim 10, further comprising a clutch coupled to said rotatable drum and said main drive to permit said rotatable drum to rotationally decouple from said main drive.

12. A rotary drum assembly according to claim 11, wherein said clutch is a single rotation clutch.

13. A rotary drum seeder according to claim 10, further comprising an air knife disposed between said hopper discharge and said rotary drum assembly.

14. A rotary drum seeder according to claim 10, wherein said seed dislodging device is a pressure shoe disposed within said rotatable drum.

15. A rotary drum seeder according to claim 14, wherein said pressure shoe is arranged such that, upon operation of said vacuum source, said seeds are drawn into operative contact with said plurality of apertures until such time as said rotary drum rotates said seeds to be in operative contact with said pressure shoe, whereupon said positive fluid pressure fluid resident in said pressure shoe overcomes said adhesion of said seeds by said vacuum source to dislodge said seeds from said plurality of apertures.

16. A rotary drum seeder according to claim 10, further comprising wheels mounted to said primary support structure to enhance its portability.

17. A rotary drum seeder according to claim 10, wherein said rotary drum includes a quick-release coupling to facilitate ease of drum interchangeability.

18. A rotary drum seeder according to claim 10, further comprising a rotary drum height adjuster operatively responsive to said controller.

19. A rotary drum seeder according to claim 10, wherein said controller includes a control panel.

20. A rotary drum seeder according to claim 10, further comprising:

a stationary mandrel disposed substantially within said substantially hollow internal portion of said rotatable drum, said mandrel including:

a vacuum port to establish fluid communication between said vacuum source and said substantially hollow internal portion of said rotatable drum; and a pressure port to establish fluid communication between said pressurized fluid source and said seed dislodging device.

21. A rotary drum seeder according to claim 19, wherein said mandrel includes coaxial annular chambers for said vacuum port and said pressure port.

22. A rotary drum seeder according to claim 10, wherein said apertures are dimpled.

23. A rotary drum seeder according to claim 10, wherein said rotary drum assembly is synchronously responsive to an article conveying apparatus such that upon detection of the approach of an article to be seeded disposed on said article-conveying apparatus, said rotatable drum rotates.

24. A system for placing a plurality of seeds on the surface of foodstuffs, said system comprising:

a source of seeds;

a rotary drum assembly in communication with said source of seeds such that said seeds are gravity-fed from said source of seeds to said rotary drum assembly, said rotary drum assembly comprising:

a rotatable drum with a substantially hollow internal portion and an axis of rotation along its length, said substantially hollow internal portion operatively responsive to and in fluid communication with a vacuum source;

a matrix of repeating patterns formed on an outer surface of said rotatable drum, each of said patterns defined by a plurality of apertures, each of said plurality of apertures connected to at least one bore so as to be in vacuum communication with said substantially hollow internal portion to promote temporary adhesion of said seeds; and a positive pressure seed dislodging device disposed within said substantially hollow internal portion to force said seeds from said rotary drum upon passage of said seeds adjacent said seed dislodging device;

a main drive coupled to said rotatable drum to provide rotational capability thereto;

a controller in electrical communication with at least said main drive; and support structure configured to act as a housing for at least said rotary drum assembly.

25. A system according to claim 24, wherein said source of seeds is a hopper.

26. A system according to claim 24, further comprising a plurality of wheels coupled to said support structure, said plurality of wheels configured to improve support structure portability.

27. A system according to claim 26, wherein at least a portion of said plurality of apertures includes dimples.

28. A system according to claim 24, further comprising a seed flow control device disposed between said source of seeds and said rotary drum assembly.

* * * * *

UNITED STATES PATENT AND TRADEMARK OFFICE
CERTIFICATE OF CORRECTION

PATENT NO. : 6,520,111 B2
DATED : February 18, 2003
INVENTOR(S) : Kirk Alan Lang It is certified that error appears in the above-identified patent and that said Letters Patent is hereby corrected as shown below:

<u>Column 6,</u>
Line 39, reads "system is positioned" should read -- system 10 is positioned --

Signed and Sealed this

Fifteenth Day of April, 2003

JAMES E. ROGAN
*Director of the United States Patent and Trademark Office*